US007735011B2

(12) United States Patent
Najdenovski

(10) Patent No.: US 7,735,011 B2
(45) Date of Patent: Jun. 8, 2010

(54) MIDI COMPOSER

(75) Inventor: Robert Najdenovski, Eslöv (SE)

(73) Assignee: Sony Ericsson Mobile Communications AB, Lund (SE)

(*) Notice: Subject to any disclaimer, the term of this patent is extended or adjusted under 35 U.S.C. 154(b) by 806 days.

(21) Appl. No.: 10/143,665

(22) Filed: May 8, 2002

(65) Prior Publication Data

US 2003/0076348 A1 Apr. 24, 2003

Related U.S. Application Data

(60) Provisional application No. 60/343,775, filed on Oct. 19, 2001.

(51) Int. Cl.
*G06F 3/00* (2006.01)
*G10H 1/18* (2006.01)

(52) U.S. Cl. ....................... 715/716; 715/727; 715/771; 84/645

(58) Field of Classification Search ................. 715/727, 715/731, 728, 716, 748, 771; 84/601, 645, 84/613, 600
See application file for complete search history.

(56) References Cited

U.S. PATENT DOCUMENTS

| | | | | |
|---|---|---|---|---|
| 5,491,751 | A * | 2/1996 | Paulson et al. | 705/51 |
| 5,751,672 | A * | 5/1998 | Yankowski | 709/238 |
| 5,792,972 | A * | 8/1998 | Houston | 84/645 |
| 5,886,274 | A | 3/1999 | Jungleib | 84/601 |
| 5,898,118 | A * | 4/1999 | Tamura | 84/602 |
| 5,959,627 | A * | 9/1999 | Duwaer et al. | 715/797 |
| 6,308,086 | B1 | 10/2001 | Yoshino | 455/567 |
| 6,506,969 | B1 * | 1/2003 | Baron | 84/609 |
| 6,635,816 | B2 * | 10/2003 | Funaki | 84/477 R |
| 6,674,955 | B2 * | 1/2004 | Matsui et al. | 386/52 |
| 6,746,246 | B2 * | 6/2004 | Cliff | 434/219 |
| 6,907,113 | B1 * | 6/2005 | Holm et al. | 379/88.23 |
| 2001/0030659 | A1 * | 10/2001 | Funaki | 345/716 |
| 2002/0011145 | A1 * | 1/2002 | Aoki | 84/609 |
| 2002/0028674 | A1 * | 3/2002 | Slettengren et al. | 455/422 |
| 2002/0170415 | A1 * | 11/2002 | Hruska et al. | 84/609 |

(Continued)

FOREIGN PATENT DOCUMENTS

DE 199 03 857 A1 8/2000

(Continued)

OTHER PUBLICATIONS

Jeremy Pickens, Feature Selection for Polyphonic Music Retrieval, pp. 428-429, ACM, SIGIR '01, Sep. 9-12, 2001.*

(Continued)

*Primary Examiner*—Tadeese Hailu
(74) *Attorney, Agent, or Firm*—Renner, Otto, Boisselle & Sklar, LLP

(57) ABSTRACT

A technique for creating polyphonic audio signals of telecommunication devices such that the technique may be performed quickly without a user needing music theory knowledge. A midi-composer application includes a graphical user interface for assisting a user in creating the polyphonic audio signal. The graphical user interface includes at least one track for receiving placement of at least one music block and a plurality of bars within the at least one track for relating the at least one music block with a selected time period. The at least one music block includes at least one type of music block representing an audio loop or sample.

18 Claims, 5 Drawing Sheets

U.S. PATENT DOCUMENTS

| | | | | |
|---|---|---|---|---|
| 2003/0069655 | A1 * | 4/2003 | Fahey et al. | 700/94 |
| 2005/0014495 | A1 * | 1/2005 | Shanahan | 455/419 |

FOREIGN PATENT DOCUMENTS

| | | | |
|---|---|---|---|
| EP | 0 726 559 | A2 | 8/1996 |
| EP | 0 851 649 | A2 | 7/1998 |
| WO | WO 92/03891 | | 3/1992 |
| WO | WO 99/65221 | | 12/1999 |
| WO | WO 01/61682 | | 8/2001 |
| WO | WO 02/077585 | | 10/2002 |

OTHER PUBLICATIONS

International Search Report for PCT/EP02/10682 completed on Jan. 16, 2003, Jan. 29, 2003, PCT.

* cited by examiner

MIDI COMPOSER

CROSS REFERENCES TO RELATED APPLICATIONS

This U.S. Patent Application incorporates herein by reference, and claims priority from U.S. Provisional Application 60/343,775 filed Oct. 19, 2001.

TECHNICAL FIELD

The present invention relates to audio signals of electronic devices, and more particularly, to an improved procedure for creating and editing polyphonic audio signals for an electronic device.

BACKGROUND OF THE INVENTION

Many electronic devices are capable of giving audio signals to alert a user of new voicemail, new email, instant messages, or incoming calls. A personal computer, for example, alerts a user to new email or instant messages with an audio signal via an audio component such as a speaker.

Other electronic devices, such as mobile stations or PDAs, are generally provided with an audio component for producing a audio signal in order to announce an incoming call, or alert the mobile station user of new voicemail or a scheduled appointment. The mobile station is often provided with a set of prestored audio signals, from which the user may choose a more individualized audio signal for one or more of the actions of the mobile station that require an audible alert. Similarly, computers are often provided with a pre-stored set of audio signals for alerting the user to new email or other actions. The prestored audio signals usually have ordinary ringing tones, as well as melodies from familiar pieces of music.

The use of mobile stations in public areas, as well as the number of computers in a confined area, have increased rapidly in recent years, causing the apparent risk that one or more neighboring electronic devices may produce the same audio signal, causing confusion as to which electronic device is producing the audio signal. Even though the number of prestored audio signals has increased, users are still constrained to a standard set of audio signal choices as programmed by the manufacturer of the electronic device. Hence, confusion may still arise from neighboring electronic devices producing the same audio signal.

Presently, mobile stations offer the ability to program an individualized audio signal by entering notes onto a staff. The mobile station then determines the tones to be played based on the location of the notes placed on the staff. However, one of the disadvantages to the above-mentioned technique is that the user is assumed to have extensive knowledge of music theory in order to create a melody on a staff. In addition, the task of placing notes on a staff can be laborious and time consuming for longer ring signals.

In an alternative approach, a new audio signal may be acoustically input by the user through a microphone attached to the mobile station. The acoustic input is sampled, converted into digital form, and stored in a memory. Subsequently, this digitally stored audio signal may be converted into analog signals and supplied to a speaker for announcing, for example, an incoming call. This approach also has its drawbacks in that the stored digital audio signal is essentially an exact representation of the original acoustic input. The input will have a less than perfect quality, and even if digital data compression is applied to the stored audio signal, the data will still require a significant amount of memory.

Therefore, there is a need for a system that a non-musician can use, without having music theory knowledge, to generate their own unique audio output signal.

SUMMARY OF THE INVENTION

The present invention overcomes the foregoing and other problems with a midi-composer application and associated method for creating polyphonic audio signals. The midi-composer application includes a graphical user interface for assisting a user in creating the polyphonic audio signal. The graphical user interface of the midi-composer application includes at least one track for receiving placement of at least one music block and a plurality of bars within the at least one track for relating the at least one music block with a selected time period. The midi-composer application also includes at least one music block of at least one type representing an audio loop or audio sample. The at least one music block is located within at least one bar of the at least one track.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
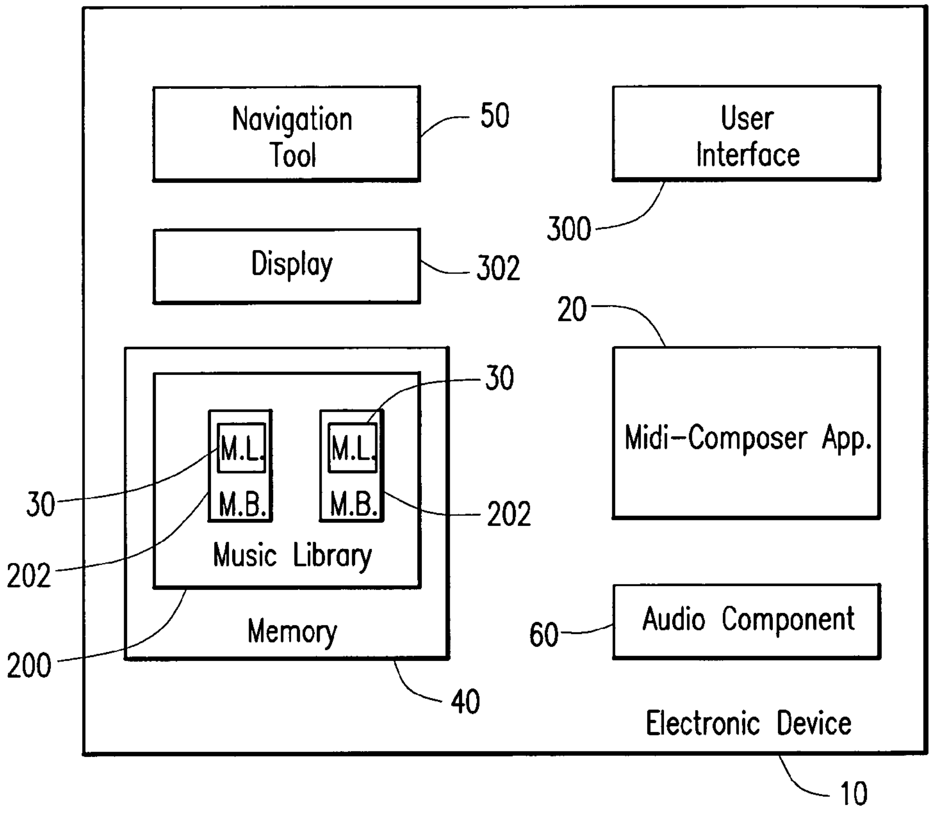
FIG. 1 is a block diagram of an electronic device including a midi-composer according to the present invention.

Referring now to the drawings, and more particularly to FIG. 1, an exemplary block diagram of an electronic device 10 including a midi-composer according to a preferred embodiment of the present invention is shown. The electronic device may comprise a mobile telephone, computer, PDA, pager or any other device providing audio alerts. The electronic device 10 enables a user to compose a customized polyphonic audio signal by utilizing a midi-composer application 20. The midi-composer 20 allows a user to select, using a navigation tool 50, from pre-recorded musical loops or samples 30 represented by music blocks 202, to compose the polyphonic audio signal. The navigation tool 50 may comprise of a mouse, touch screen and joystick, etc. The midi-composer application 20 enables presentation of a graphical user interface 300 on a display 302 of the electronic device 10. A user browses through at least one music library 200 stored in a memory 40 to select a music block 202 of interest. The selected music block 202 is placed by using a drag and drop operation, cut and paste operation, or other similar techniques, onto a particular location of the user interface 300 as may be more fully described in a moment. The technique used to place a music block onto a location depends on the type of electronic device 10 used. For example, a computer may use a copy and paste operation, whereas a PDA may use a drag and drop operation. In addition, the user may drag and drop, or copy and paste, one or more music blocks 202 at a time. The user continues to place music blocks 202 onto specific locations of the user interface 300 with the navigation tool 50 until the desired polyphonic audio signal is created.

Figure 2:
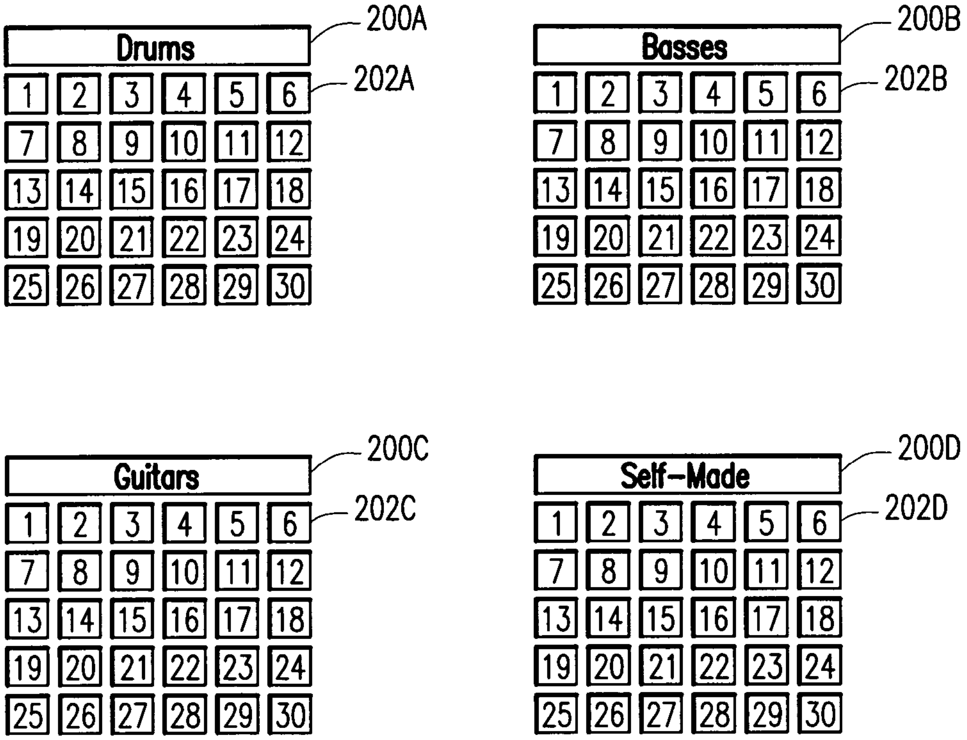
FIG. 2 illustrates examples of music block libraries for use with the user interface in accordance with a preferred embodiment of the present invention.

Now referring to FIG. 2, examples of music libraries 200 for use with a graphical user interface 300 of the midi-composer 20 is illustrated. The music blocks 202 represent pre-recorded musical loops or samples 30 that can be melodies or other sounds from a variety of sources or instruments. The musical loops or samples 30 can be divided into different music libraries 200 and presented to the user via the graphical user interface 300. The music libraries 200 can be organized to correspond to the type of music loops or samples 30 stored therein. For example, a rhythm library 200A includes a variety of musical loops or samples 30 from drums, cymbals, maracas, or other rhythm instruments from which the user may select. A bass library 200B includes a collection of bass loops or samples 30 pre-recorded from, for instance, a bass guitar, piano bass, or tuba. A accompaniment library 200C includes accompaniment loops or samples 30 pre-recorded from, for example, an electric or acoustic guitar, or a trumpet. Each user can also create music loops or samples 30 of any recordable sound such as a melody including voice, piano, or trumpet, and store the music loops or samples 30 in solo blocks 202D. The solo blocks 202D can be stored in a solo library 200D, and used to create or edit the polyphonic audio signal. The music libraries 200 may also be purchased or loaded from alternate sources and have additional libraries such as jazz, symphony, dance, and other types of sounds.

The user browses through any of the music libraries 200 to select a music block 202 to insert into the polyphonic audio signal the user is creating or editing. For example, a user may want to compose an audio signal with a block 202A. The user then selects the rhythm library 200A using the navigation tool 50, and browses through rhythm blocks 202A comprising different ready-mixed sequenced loops or samples of drums, cymbals, or maracas.

The blocks 202 represent midi, wav, or files of other formats for storing audio files. The music blocks 202 may comprise a single bar of music, or stretch over several bars. A bar is a unit of time used in music, and therefore each music block may vary in the length of time that each particular music block 202 lasts.

The user browses the rhythm blocks 202A with the navigation tool 50 in order to highlight a specific rhythm block 202A. The user highlights a specific rhythm block 202A by using the navigation tool 50 to move a cursor or marker to the specific music block 202 of interest. When a specific rhythm block 202A is highlighted, the electronic device 10 outputs an audio signal to an audio component 60 to play the rhythm loop or sample represented by the rhythm block 202A. The user hears the selected rhythm loop or sample 30 being played by the audio component 60. The user can select the highlighted block 202A, for placement in the GUI 300 or navigate to a different block 202A to hear a different loop or sample. The user selects a block by, for example, pressing a button on a joystick or mouse. A copy of the selected block 202A is made in order to drag and drop, or copy and paste, the block 202A onto a location of the graphical user interface 300. One music block 202 may be dragged and dropped, or copied and pasted, from the music library 200 to the graphical user interface 300 at a time, or alternatively, several music blocks 202 from a music library 200 can be selected and dropped onto the chosen location of the graphical user interface 300. The user repeats the same process for browsing, selecting, and dropping any music block 202 from any of the music libraries 200 onto the graphical user interface 300.

Figure 3A:
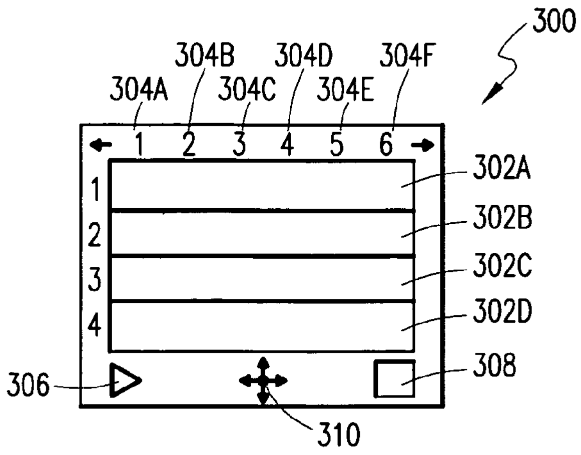
FIG. 3A is an exemplary view of a user interface for a midi-composer in accordance with a preferred embodiment of the present invention.

Now, with reference to FIG. 3A, the graphical user interface 300 of the midi-composer application 20 for creating or editing a polyphonic audio signal will be described. Once the user has selected at least one block 202 as described above, the user drags and drops, or copies and pastes, the block 202 into a track 302. A track is an allotted position to which music is recorded. Several tracks may be layered together so that the tracks play at the same time, allowing, for example, a voice track to play at the same time as a accompaniment track. The user also places the block at a particular bar 304. The position of the music block 202 within the bar 304 indicates the point in time at which the block 202 is played. The user can place a block 202 on any track 302 at any bar 304 using a navigation tool 50 to maneuver through the different tracks 302 and bars 304.

The user may create or edit a polyphonic audio signal with only one track 302, or optionally the user may layer two or more tracks (302A, 302B, 302C, 302D) on top of each other so that a plurality of sounds can be played at one time. Preferably, one track 302 is used for each music library 200, thereby simplifying the process of creating or editing the polyphonic audio signal. In addition, each music library can be color coded to further simplify the process. For instance, one track 302A may be for the rhythm type of music blocks 202 and be colored red, another track 302B may be for the accompaniment type of music blocks 202 and be colored green, and other tracks 302 may be used for additional libraries 200 and be denoted by different colors. The tracks 302 can be played at the same time to create the customized polyphonic audio signal. After the user has placed the music blocks 202 onto the graphical user interface 300, a play button 306 may be pressed by the user to play the current music blocks 202 placed as they are presently arranged in the graphical user interface 300. The user may also press a stop button 308 to cease playing of the music blocks 202. The user may also navigate through the tracks 302 and bars 304 of the graphical user interface 300 by using a scrolling button 310, which includes a forward button and a reverse button, in order to place a music block 202 at a certain location, or to listen to a certain bar of the graphical user interface 300. The forward button allows a user to scroll forward through the signal and the reverse button allows a user to scroll back through the signal. A user may also choose a special music block 202 or specific location on the user interface 300 by pressing certain numbers on the keypad. For example, a user may choose a music block 202 with the label "58". The user then selects that particular music block 202 by pressing the numbers 5 and 8 on the keypad.

Figure 3B:
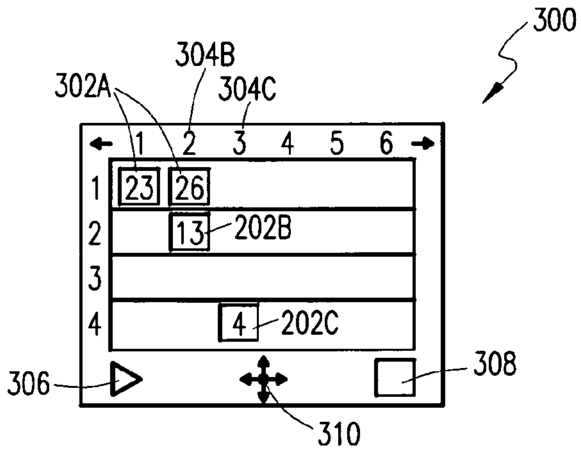
FIG. 3B is an exemplary view of the creation of a polyphonic audio signal using the user interface of FIG. 3A.

FIG. 3B represents the graphical user interface 300 on which the user has begun to create or edit the polyphonic audio signal. As shown, the user has selected two blocks 202A and drags and drops, or copies and pastes, them into a first track 302A. The user has also chosen a bass block 202B to play at the second bar 304B concurrently with the second block 202A. A accompaniment block 202C has been selected for the third bar 304C to play immediately after the concurrent block 202A and bass block 202B cease to play. The user can continue to add or delete music blocks 202, or modify the placement of existing music blocks 202 on the tracks 302, until the user is satisfied with the polyphonic audio signal.

Figure 3C:
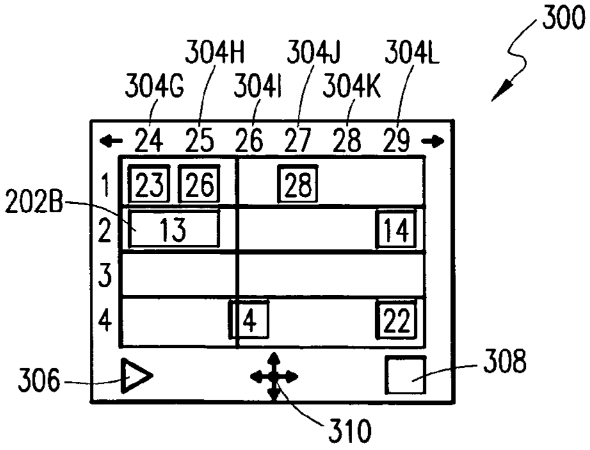
FIG. 3C is an exemplary view of a completed polyphonic audio signal using the user interface of FIG. 3A.

In the finished polyphonic audio signal, as shown in FIG. 3C, the user has selected a plurality of music blocks 202, some one bar long, others two bars long. The user can also create a bar 304K that does not play any music. The user may scroll through the entire polyphonic audio signal to ensure correctness and make any modifications. Once the polyphonic audio signal has been created or edited, the user may save the audio signal. Then the user may select the customized audio signal as the default setting for alerts such as an incoming call. The polyphonic audio signal may also be transmitted to another device via the Internet, Bluetooth protocols, or other similar means of transmission.

Figure 4:
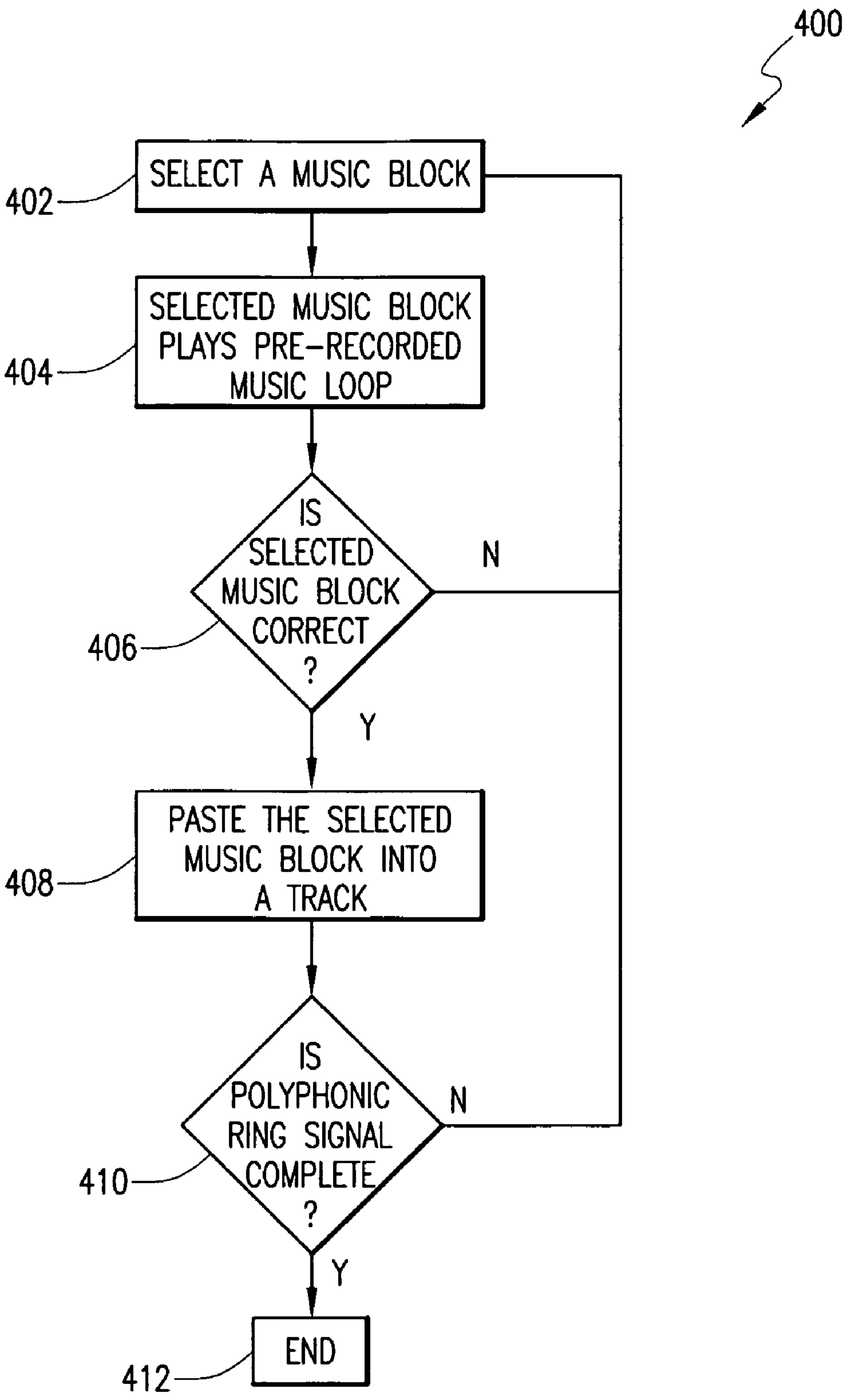
FIG. 4 is a flow diagram illustrating generation of a polyphonic audio signal according to a preferred method of the present invention.

Now with reference to FIG. 4, a method 400 for creating a polyphonic audio signal according to the preferred embodiment of the present invention will be described. A user can browse through a variety of music blocks 202 and listen to each music block 202 until a particular music block 202 of interest is discovered. The user, at step 402, selects the music block of interest. The particular music block 202 is selected with the navigation tool 50, for example a joystick or mouse. When the button on the joystick or the mouse is pressed, the chosen music block 202 is highlighted. At step 404, the user can listen to the highlighted music block 202 to determine if the highlighted music block 202 is, in fact, the music block 202 the user wants to select. If the user concludes that the highlighted music block 202 is correct at step 406, then the music block 202 can be selected by pressing the button on the joystick or mouse again. If it is determined that the highlighted music block 202 is not wanted, then the user may simply continue to browse the music blocks 202 with the joystick. Although the preferred embodiment implements a joystick or mouse as the navigation tool, keypad buttons, a stylus, or a variety of other navigation tools may be used as well. For example, the user may select a music block 202 by pressing a stylus to the desired music block 202. Alternatively, the user may also maneuver through the music blocks 202 by using keypad buttons.

Once the music block 202 is selected, the user may drag and drop, or copy and paste, the music block 202 into a track 302 at step 408. The preferred embodiment of the present invention positions the music block 202 onto the track 302 by first making a copy of the selected music block 202. The copied music block 202 floats at the end of a marker depicting the position of the joystick on a screen of the electronic device. The floating music block 202 is then dragged, or copied and pasted, onto the track 302 by maneuvering the joystick to position the music block 202 at the desired location. The music block 202 is dropped onto the track 302 by releasing the button on the joystick or mouse again. It should be realized that use of a drag and drop operation is merely intended to be exemplary and other methods for transferring a copy of a music block into the graphical user interface, such as a copy and paste technique, may be used.

Next, if it is determined that the polyphonic audio signal is complete at step 410, then the procedure is ended at step 412. If, for example, the user wishes to add another music block 202 at step 410, then the procedure is repeated starting over at step 402. The user may select as many music blocks 202 and tracks 302 as desired to complete the polyphonic signal.

Figure 5:
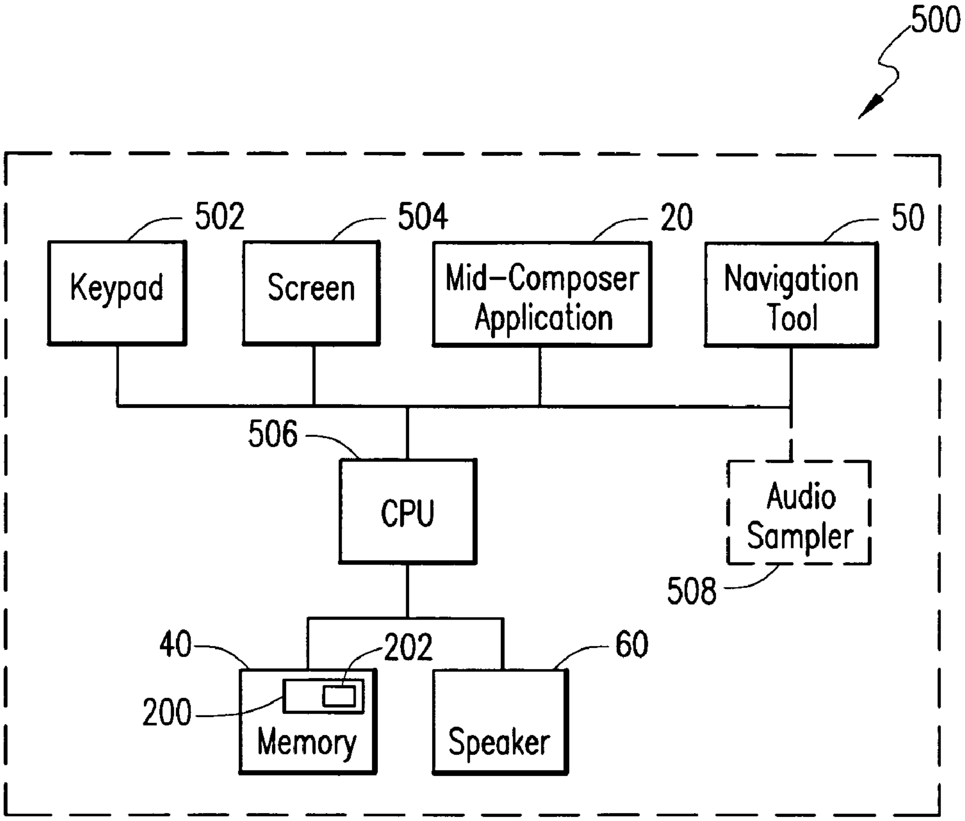
FIG. 5 illustrates a block diagram of a mobile station incorporating the midi-composer according to the present invention.

FIG. 5 depicts a block diagram of a mobile station 500 incorporating a preferred embodiment of the present invention. A user browses, using the navigation tool 50 or keypad 502, through at least one music library 200 or music block 202 stored in the memory 40. The music libraries 200 and/or music blocks 202 are displayed to the user on a screen 504 of the mobile station 500. When a music block 202 is selected using the navigation tool 50, the user drags, or copies and pastes, the music block 202 on to a track of a graphical user interface 300 which is generated onto a screen 504 by the midi-composer application 20 and displayed on the screen 504. Once the polyphonic audio signal is generated using the midi-composer application 20, the polyphonic audio signal is stored in the memory 40, and a default flag is set at the CPU 506 causing the polyphone audio signal to be played upon the occurrence of specified events such as an incoming call. The next occurrence of the specified event will actuate the new customized audio signal which is played through the speaker 60. Although the preferred embodiment illustrates a navigation tool 50 in addition to a keypad 502, those skilled in the art will understand that the keypad 502 may function as the navigation tool 50, and therefore, the navigation tool 50 would be unnecessary.

In an alternate embodiment, the mobile station 500 may also have the ability to record and store self-made audio loops or samples. In this case, the mobile station 500 may also include an audio sampler 508 for receiving audio signals. The self-made audio signals can be stored in the memory 40 in a solo library 200D or elsewhere. The midi-composer application 20 can then create music blocks 202 for the self-made audio signals so that the user can incorporate the solo blocks 202 into the polyphonic audio signal.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for creating an audio signal in a mobile telephone including a display and navigation tools, said method comprising the steps of:

storing a plurality of music libraries each having at least one music block in the mobile telephone;

using navigation tools to define at least one user input to correspond respectively to the at least one music block;

selecting at least one music block from the library including the at least one music block with the navigation tools using the corresponding user input;

associating a plurality of tracks with the plurality of libraries, wherein each track is used for one corresponding music library;

displaying at least two tracks of the plurality of tracks on the display, each of the at least two tracks having a plurality of bars in a graphical user interface; and using the navigation tools to place the selected music block onto the track for the library containing the selected music block at a selected bar of the plurality of bars in the graphical user interface to compose the audio signal.

2. The method of claim 1, further comprising the step of setting the audio signal as a default audio signal for an alert of the mobile telephone.

3. The method of claim 1, further comprising the step of moving the location of a chosen one of the placed music blocks to a different bar of the plurality of bars using the navigation tools.

4. The method of claim 1, further comprising the step of deleting a chosen placed music block using the navigation tools.

5. The method of claim 1, wherein said storing step comprises the steps of: recording a self-made audio loop; and storing said recorded self-made audio loop as a music block in the at least one library.

6. The method of claim 1, wherein said music blocks are at least one of an instrument block and a solo block.

7. The method of claim 1, wherein the at least one library and the at least two tracks are stored in a memory within the mobile telephone.

8. A mobile telephone comprising:

a midi-composer application for creating a polyphonic audio signal and for creating a graphical user interface;

a screen for displaying information on the mobile telephone, including displaying the graphical user interface, the graphical user interface displaying at least two available tracks, each of the at least two available tracks having a plurality of bars;

a memory accessible by the midi-composer application for storing a plurality of music libraries each containing at least one music block for use in creating the polyphonic audio signal, wherein each track is used for one corresponding music library;

a navigation tool included within the mobile telephone for defining at least one user input to correspond respectively to the at least one music block and for selecting a music block using the corresponding user input;

the navigation tool included within the mobile telephone further being operable for placement of the selected music block in at least one of the plurality of bars within a track corresponding to the library containing the selected music block and displayed in the graphical user interface to compose the polyphonic audio signal; and a speaker for playing audio signals, including playing the polyphonic audio signal created by the midi-composer application.

9. The mobile telephone of claim 8, wherein said navigation tool is at least one of a keypad, joystick, mouse, and stylus.

10. The mobile telephone of claim 8, further comprising an audio sampler for receiving a solo audio signal, wherein the memory stores the solo audio signal.

11. The mobile telephone of claim 10, wherein the midi-composer application is operable to incorporate the solo audio signal into the polyphonic audio signal.

12. The mobile telephone of claim 8, wherein said navigational tool is further operable to move said desired music block from the music library to at least one of the at least two available tracks of the user interface.

13. A midi-composer application for creating a polyphonic audio signal within a mobile telephone including a display, and navigation tools, said midi-composer comprising:

a graphical user interface displayed on the mobile telephone display for assisting a user in creating the polyphonic audio signal, the graphical user interface including at least two tracks for receiving placement of at least one music block and a plurality of bars within the at least two tracks for relating the at least one music block with a selected time period;

control logic for associating the tracks with a plurality of libraries, wherein each track is used for one corresponding music library; and control logic responsive to a user input via the navigation tools for defining at least one user input to correspond respectively to the at least one music block and for selecting at least one music block located within a library using the corresponding user input, and for placing the selected at least one music block within the at least one bar of the track of the graphical user interface corresponding to the library containing the selected music block to compose the polyphonic audio.

14. The midi-composer application of claim 13, wherein said type of music block is at least one of a accompaniment type, a bass type, a rhythm type, and a solo type.

15. The midi-composer application of claim 13, further comprising a play button operable to play the polyphonic audio signal on the graphical user interface.

16. The midi-composer application of claim 13, further comprising a stop button operable to stop playing the polyphonic audio signal on the graphical user interface.

17. The midi-composer application of claim 13, further comprising a forward button operable to scroll forward through the polyphonic audio signal on the graphical user interface.

18. The midi-composer application of claim 13, further comprising a reverse button operable to scroll backward through the polyphonic audio signal on the graphical user interface.

* * * * *